W. G. HAY.
APPARATUS FOR REMOVING FLUE DUST OR DIRT AND THE LIKE.
APPLICATION FILED APR. 14, 1914.
1,115,193.
Patented Oct. 27, 1914.
2 SHEETS—SHEET 1.
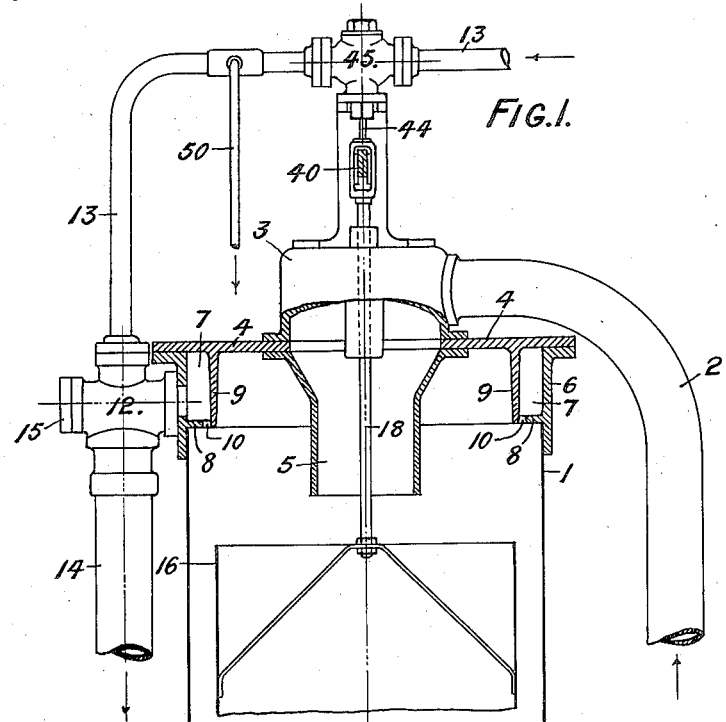
FIG. 1.
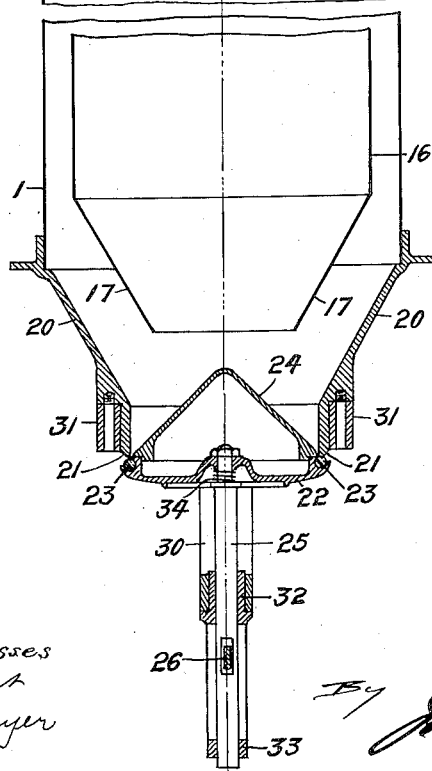
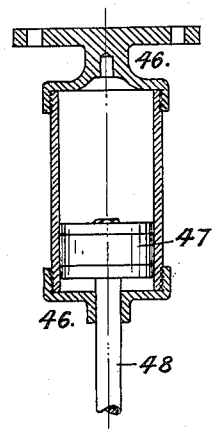
FIG. 3.
Witnesses
Inventor
W. G. Hay
By
Atty.

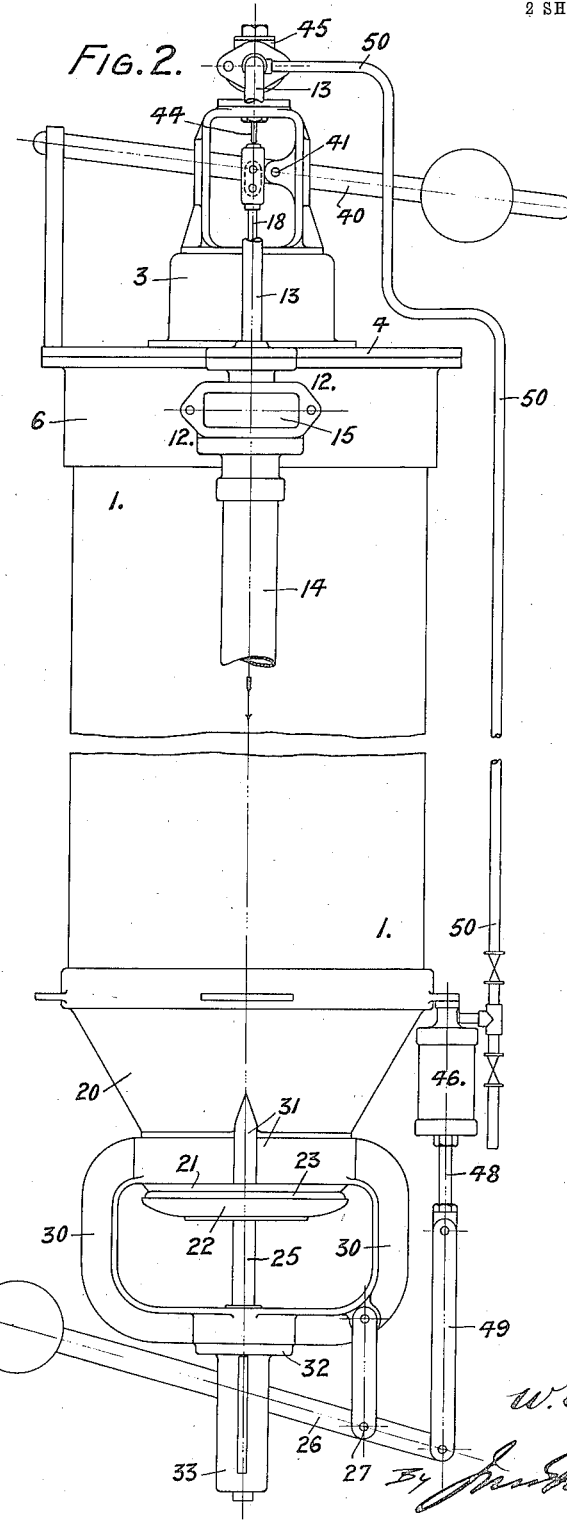

UNITED STATES PATENT OFFICE.

WILLIAM GEORGE HAY, OF PRESTWICH, ENGLAND.

APPARATUS FOR REMOVING FLUE DUST OR DIRT AND THE LIKE.

1,115,193.  Specification of Letters Patent.  Patented Oct. 27, 1914.

Application filed April 14, 1914. Serial No. 831,869.

*To all whom it may concern:*

Be it known that I, WILLIAM GEORGE HAY, a subject of the King of England, residing at 104 Kings road, Prestwich, in the county of Lancaster, England, have invented new and useful Improvements in and Connected with Apparatus for Removing Flue Dust or Dirt and the like, of which the following is a specification.

This invention has reference to apparatus or means for removing and dealing with dust or dirt or granular matter from flues of steam generators and other furnaces, and from other analogous chambers; and more particularly to that system wherein the dust and like matters is moved by a vacuum created within a vessel, say by a steam ejector, and the dust or material being conveyed through a pipe—owing to the vacuum and air acting on the material—to the vessel in which the vacuum is maintained. And the matters so collected are subsequently discharged from the vessel or container into which they have been moved.

The chief object of this invention is, primarily, to provide improvements in connection with apparatus of the kind referred to, by which, not only is the dust or material readily and economically moved, but the apparatus is rendered automatic in its action, generally.

The exhausting of the vessel into which the dust or dirt is delivered, and the discharge of the air from it, is effected by a fluid ejector apparatus, to which "power" steam is delivered by an automatically operated valve, which operates in one direction, namely, closes, when the vessel is full or charged to the required degree, by a species of "float" device, which when the vessel is filled to a given point, becomes filled itself partly, and the weight in it, when reaching a certain point, presses it down, and lifts up a counter balance weight or spring, and releases a door or valve—say of the mushroom valve type; the steam valve being adapted to close in the direction of flow of steam past it, so that it is cut off and exhausting stops, when the vessel is charged; and thereupon, also, steam to a small cylinder or the like, connected with an automatic discharge door at the bottom, is cut off, and the weight of the material on the bottom door or valve causes it to open.

When the lower door is open, and the contents discharged, say into a cart or other receptacle, the weight of the balance lever referred to, comes into action, and lifts up the float device through a rod, passing down, say, into the apparatus, and by the movement of the lever by this weight, the steam regulating valve of the injector is opened, and the ejector started, and reexhausts the vessel. At the same time, steam passes by a pipe on the ejector pipe (between the steam valve and ejector) to the small cylinder of the lower door operating means and presses the piston down, and through levers, presses the discharging door up, and effects the closure.

The invention will be further described with reference to the accompanying drawings, which show one and an advantageous arrangement and combination of parts comprising the characteristics above described.

In these drawings, Figure 1 is a vertical section of the apparatus; Fig. 2 an outside view seen at 90 degrees from that given in Fig. 1; and Fig. 3 shows details.

1 represents generally the body of the receiver or vessel into which the dust or dirt is introduced; 2 is the pipe conveying the air carrying the dust or dirt to the vessel, it being connected to a central hood or box 3 on the upper cover 4 of the vessel, and leading into a central pendant conduit 5, dipping down into the interior of the vessel.

6 represents the upper casting or ring of the upper end of the vessel 1, on which rests the cover 4; and the air passed into the vessel is carried away from it into a chamber 7 formed within this ring 6 by an annular flange 8, and a depending flange 9 on the cover 4, between the lower portion of which, and the edge of the ring or flange 8, there is a narrow annular aperture 10, or ring of apertures, through which the air passes into the chamber 7.

The steam jet ejector is generally designated 12; and its induction passage is connected up and communicates with the annular chamber 7. The ejector is of any known suitable kind, and has a steam supply pipe 13, and a discharge pipe 14; and it also has a readily removable door 15 on it, so that the internal parts may be readily got at and cleaned if they become choked or dirty.

16 is the "float" device, the body of which is cylindrical, and is somewhat less in diameter as indicated, than the vessel 1; and it has on its lower end a conical bottom 17, which at the lower edge is open. And the upper part of this float is open, and is directly under the mouth of the inlet conduit 5.

The float is movable up and down, and is supported by a central rod 18, which is connected with a steam supply valve, and operates as hereinafter described.

The lower end of the vessel 1 is tapered as shown, and this portion is in the form of an inverted conical or hopper casting 20, having at its lower edge, a seat 21, surrounding or forming the discharge mouth of the apparatus, in connection with which works the bottom door 22; the edge of which is provided with a suitable packing 23, which constitutes the face of this valvular door.

The relative dispositions of the conical bottom 17 of the float, the bottom 20, and the door 22, are about those shown by the drawing.

The door 22 has a conical inner portion 24 which serves as a directing device to the discharge of dust when open. The door is carried by and operated through a vertical shaft 25, and a weighted lever 26 which passes through it and is fulcrumed at 27; and is also connected up at its outer end with an operating apparatus hereafter described.

The shaft 25 is supported and guided by a bracket 30, fixed by a ring 31 to the neck of the hopper 20; the bracket having bearings 32, 33, carried from the bottom of it, and carrying also the fulcrum 27, by a link, as shown.

A spring 34 is provided between the bottom of the door 22 and supporting shoulder of the shaft 25, so as to allow of movement of the door in a horizontal plane on the spindle 25, in order to give play, and enable the packing 23 of the door, to more readily effect a closure with the seat 21 all around.

The float 16 is connected by a rod 18 to a weighted lever 40, fulcrumed at 41 to the bracket 42 on the hood or cap 3; and this rod operates at its upper end on the spindle 44 of the valve 45, which controls the supply of steam to the ejector 12. This valve opens upward and closes downward, so that when the float 16 and rod 18 move up, the valve 45 is open; and when they move down, it is closed.

The door 22 is operated by a cylinder 46, (see Fig. 3) attached to the hopper 20, and a piston 47, which is connected to the weighted lever 26 by the rod and links 48, 49; and steam is introduced into the upper part of the cylinder 46 by a pipe 50 connected with the main steam pipe 13, at a point between the valve 45 and the ejector 12; so that steam is only supplied to this cylinder 46 when the valve 45 is open.

In practice, the pipe 50 condenses steam in it, so that the cylinder 46 will in fact be filled with water, which works better than the steam direct.

In action, assuming the ejector 12 to be in action, and the door 22 closed, a rarefaction will be created within the vessel 1, and therefore the dust or dirt carried by the air, will be caused to flow through the nozzle device up the pipe 2, into the interior of the vessel 1, and into the interior of the float 16, which is directly under the spout or mouth of the central conduit 5. The fluid will thus pass into the float, and the dust or dirt particles will, to a very large degree, fall down into the float, and separate from the air; and as this material passes through the opening in the bottom of the float cone 17, it fills the space of the hopper 20 below it until it rises to a point where the deposited material will be in contact with, and seal the lower end of the float hopper 17; when it will begin to accumulate within the float leaving the space outside the hopper part 17 empty. When a certain quantity of material has accumulated in the float, the mass acting on the bottom of the hopper 17, causes it to sink into the material in the bottom of the hopper 20, and so, through the rod 18, it will close the steam ejector motor fluid controlling valve 45, so that the rarefaction in the vessel 1 will cease; while the steam supply by the pipe 50 to the cylinder 46 will be cut off by the closure of the valve 45. Hence, the weighted lever 26—now released of the counter pressure due to the steam acting on the piston 47—will fall, and so will move down the door 22, and open it; and the contents of the apparatus will flow out of it, being directed by the cone 24 into an annular diverging stream. When the vessel 1 is empty, the weighted lever 40, being greater than the weight of the float 16 and its attached parts, will lift the float up, and so, through the rod 18 and valve spindle 44 which is acted upon by it, will open the valve 45, and supply again steam both to the ejector 12 and to the door actuating cylinder 46; the action of which will cause the piston 47 to descend, and move the door 22 toward its seat; and the ejector being now in action, a current of air will be caused to flow in through the annular space existing between the door packing 23, and the hopper seat 21, and will sweep off any dust or dirt lying on these parts, as the area between the valve and door is gradually decreasing in closing, and this constitutes a self-cleansing action, and assures a tight closure of the door. When the door is closed, the minus pressure in the vessel 1 will take place, the action is repeated, and all automatically.

With regard to the door operating cylinder, the action may be controlled and rendered quiet, both in opening and closing, by having on or connected with the steam pipe leading to the cylinder or cylinder itself, a ball or other non-return valve, which opens freely upward, and closes downward against the supply of steam to the cylinder; while the steam supplied is by-passed through a pipe, and a valve on it, for regulating it, so as to control the rate of the closing of the door by the presence of the steam; while the escape of steam, when the main steam valve of the system supplying the ejector is closed, is free.

The extraction of air from the vessel 1 caused by the ejector 12, takes place at the upper outer angle of the vessel at a considerable distance from the mouth of the inlet spout 5; and as the exit port 10 is of a regulated area, an equal quantity of air from the circumference of the column of air passing into the apparatus through the spout 5, will be extracted, and thereby enables the dust or solid substances carried by the air, to deposit freely and uniformly, and so that the air drawn off from the apparatus and discharged contains as little air as possible.

The pipe 2 may be led to the place where the dust is to be removed from, and in the case of this being the flues of steam generators, it will be led to a point adjacent to them, with suitable branches having removable stoppers, by which the flexible pipe to which the nozzle it attached, can be connected up with the main pipe 2.

The whole apparatus shown, is supported in any suitable way above the ground or surface, so that the contents can be dropped into a cart direct, or other vehicle.

What is claimed is:—

1. An apparatus for the removal of flue dust, dirt and the like comprising a vessel, an ejector in communication with the said vessel, means for controlling the supply of steam or motor fluid to the ejector, said means comprising a movable vessel arranged to receive the dust or dirt, the said vessel open at its top and bottom and having its lower end above the bottom of the main vessel, the movable and main vessels so arranged that the first portion of the dust received passes to the bottom of the main vessel, and subsequently the dust and the like collects in the movable vessel, the said vessel when charged moving into the dirt or dust in the bottom of the main vessel due to the weight of the said charge.

2. An apparatus for the removal of dust, dirt and the like comprising a vessel, a jet exhausting apparatus in communication therewith, a movable float within the vessel and having its lower end open, a discharge door in the bottom of the vessel and below the float, a steam supply valve operated by the said float and connected to the exhausting apparatus, means for operating the discharge door, said means controlled by the steam supply valve, and an air and dust introducing conduit located at the center of the vessel and dipping down into the same and discharging directly above the upper part of the float for the purpose described.

3. An apparatus for the removal of dirt, dust and the like comprising a vessel, a hollow open end float therewithin, an ejector in communication with the vessel, a door in the bottom of the vessel and below the float, means for operating the said door, a steam supply valve operated by the float, the said supply valve connected to and providing means for operating the ejector and the door operating means, and a dust and air introducing conduit discharging into the upper end of the float, the parts arranged as and for the purpose described.

In testimony whereof I have signed my name to this specification in the presence of two subscribing witnesses.

WILLIAM GEORGE HAY.

Witnesses:
SOMERVILLE GOODALL,
C. F. ROYSTON.